United States Patent [19]

Howard

[11] 4,418,931
[45] Dec. 6, 1983

[54] REMOTELY ADJUSTABLE STEERING COMPENSATOR

[76] Inventor: Durrell U. Howard, 306 Krameria Dr., San Antonio, Tex. 78213

[21] Appl. No.: 296,617

[22] Filed: Aug. 27, 1981

Related U.S. Application Data

[63] Continuation-in-part of Ser. No. 93,968, Nov. 14, 1979.

[51] Int. Cl.³ .......................... B62D 5/06; B62D 15/00
[52] U.S. Cl. ........................................ 280/94; 280/89; 280/90
[58] Field of Search ...................... 280/94, 89, 90, 271

[56] References Cited

U.S. PATENT DOCUMENTS

| | | | |
|---|---|---|---|
| 1,745,117 | 1/1930 | Plank | 280/94 |
| 2,690,916 | 10/1954 | Gilliam | 280/94 |
| 3,056,461 | 10/1962 | Quayle | 280/94 |
| 3,111,103 | 11/1963 | Bennett | 114/66.5 |
| 3,171,298 | 3/1965 | Henri-Biabaud | 280/94 |
| 3,183,992 | 5/1965 | Brueder | 280/94 |
| 3,333,863 | 8/1967 | Bishop | 280/94 |
| 3,373,631 | 3/1968 | Henri-Biabaud | 280/94 |
| 3,426,612 | 2/1969 | Henri-Biabaud | 280/94 |
| 3,583,515 | 6/1971 | Schwenk | 280/94 |
| 3,628,487 | 12/1971 | Bennett | 114/66.5 |
| 3,695,204 | 2/1972 | Bennett | 114/66.5 |
| 3,848,885 | 11/1974 | Hefren | 280/94 |
| 3,882,954 | 5/1975 | Inoue | 280/94 |
| 3,958,656 | 3/1976 | Niemann | 180/79.1 |

FOREIGN PATENT DOCUMENTS

| | | |
|---|---|---|
| 354137 | 8/1931 | United Kingdom . |
| 798110 | 7/1958 | United Kingdom . |
| 1132497 | 11/1968 | United Kingdom . |
| 1237020 | 6/1971 | United Kingdom . |
| 1443676 | 7/1976 | United Kingdom . |
| 1490876 | 11/1977 | United Kingdom . |

Primary Examiner—Joseph F. Peters, Jr.
Assistant Examiner—Donn McGiehan
Attorney, Agent, or Firm—Pollock, Vande Sande & Priddy

[57] ABSTRACT

A steering compensator for connection to the steering system of a vehicle at a location between a steerable member and a reduction gear so as to provide a resistance force preventing substantial movement of the steerable member away from a preselected position until the steering force generated on the low ratio side of the reduction gear exceeds a predetermined value. A return assembly provides a return force continuously biasing the steerable member toward its preselected position during its movement through a predetermined distance to either side thereof. A trim mechanism may be provided to remotely vary the preselected position of the steerable member. Other optional features include a fluid system for preventing movement of the steerable member until the steering force exceeds the return force by a preselected differential force, a variable fluid resistance to steerable member movement, and components for controllably varying the resistance force, differential force and/or return force.

42 Claims, 6 Drawing Figures

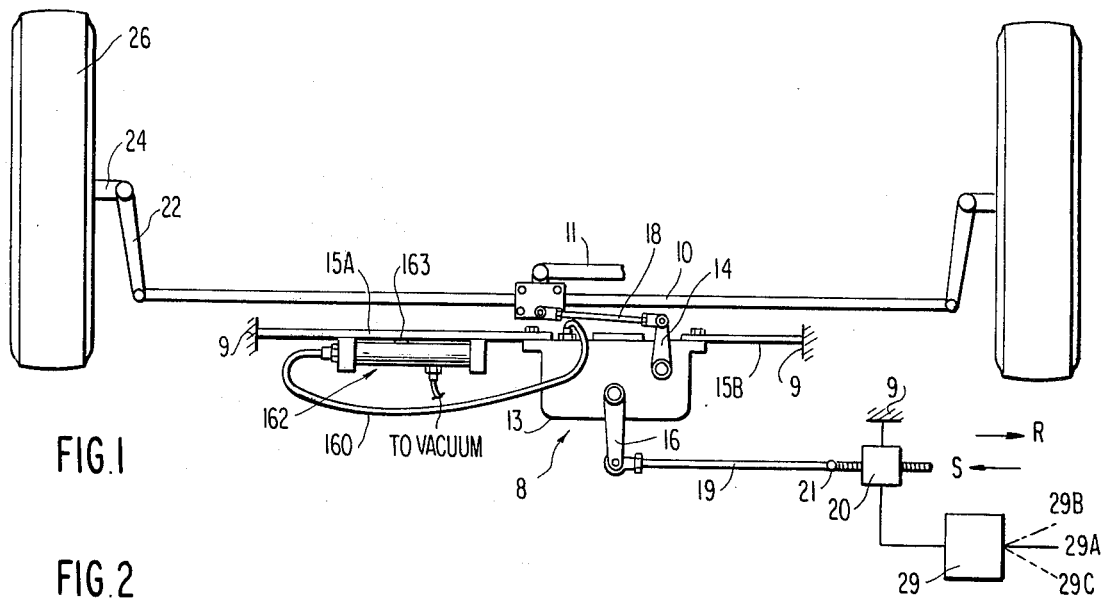
FIG.1
FIG.2
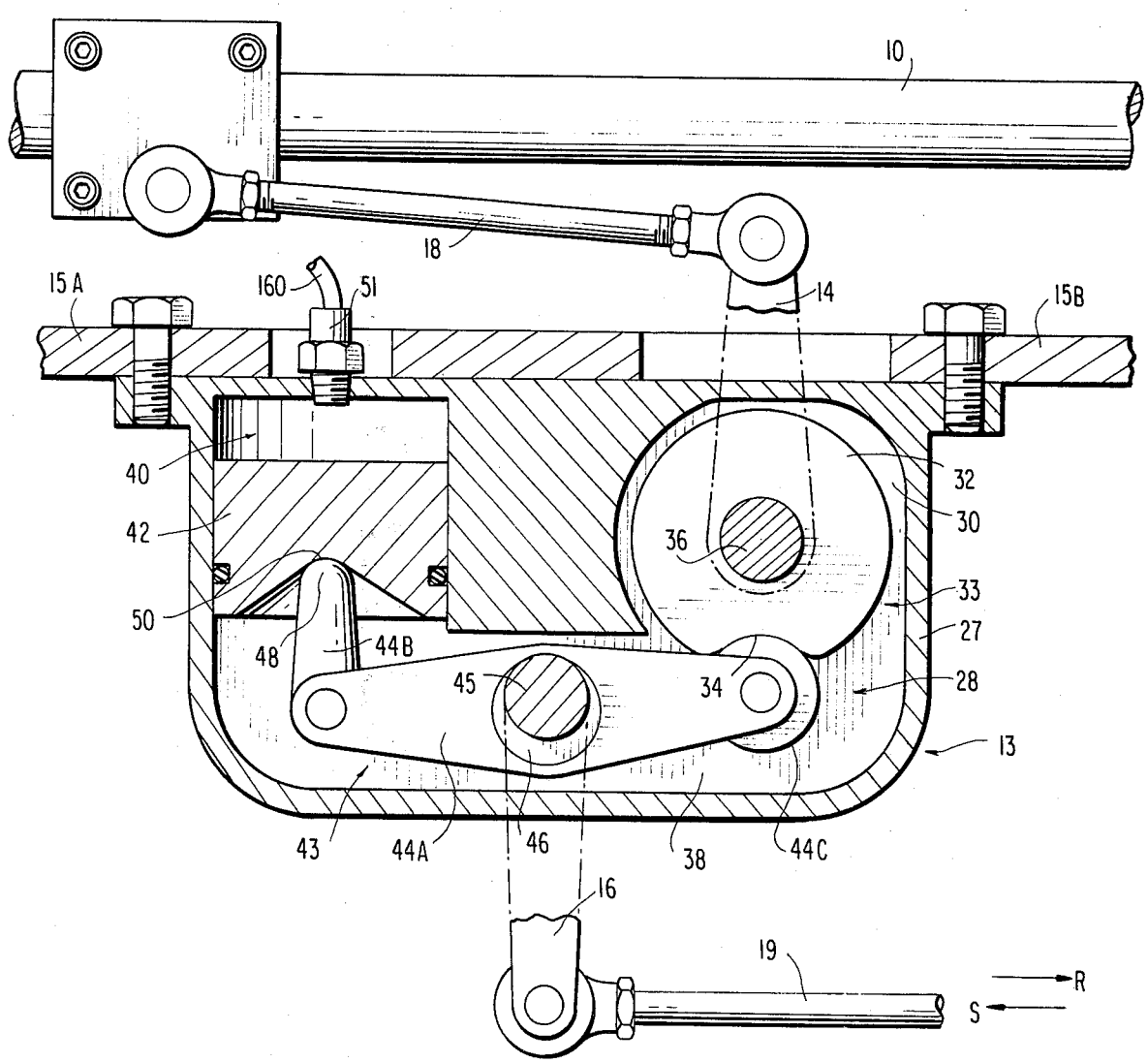

REMOTELY ADJUSTABLE STEERING COMPENSATOR

RELATED APPLICATION

The present application is a continuation-in-part of co-pending application Ser. No. 093,968, filed Nov. 14, 1979, by Durrell U. Howard, who is also the inventor of the present application. The subject matter of said co-pending application Ser. No. 093,968 is hereby incorporated into the present application by reference.

TECHNICAL FIELD

This invention relates to vehicle steering systems and more particularly to a compensating device for keeping such systems in their center position in the absence of intentional steering inputs for turning the vehicle from its straight ahead path. The invention is especially useful as a centering device for power steering systems on highway vehicles, such as automobiles and trucks.

BACKGROUND ART

Steering systems for highway vehicles and the like are designed primarily for driver control. In these systems, the steering force required on the steering member and the ratio between steering member movement and movement of the steerable ground wheel takes into consideration the characteristics of the particular vehicle and the conditions under which it will usually be operated. A wide variety of forces can act on vehicle steering systems and these must be dealt with satisfactorily in order to provide a stable and controllable vehicle. As vehicle speed increases, the effects of any adverse steering inputs are multiplied, making it necessary for the driver to exercise more precise and careful driving control.

Vehicles with stable steering systems track relatively straight ahead and generally resist all steering inputs away from center, including those of the driver. Intentional turning maneuvers by the driver therefore require sufficient turning force to overcome this positive resistance to movement away from center. When the driver relaxes the turning force applied to the steering wheel, a stable system has a strong tendency to return to its straight ahead position and normally does not overshoot the neutral or center position. By contrast, an unstable steering system provides relatively weak or no positive return to center and may overshoot and sometimes oscillate about the center position. Therefore, with an unstable system, a straight, unswerving vehicle track can be maintained only by constant driver control through precision steering inputs to the steering system. The amount of driver attention required to keep the less stable vehicle tracking straight may vary considerably because forces of many different magnitudes and types can produce spurious steering inputs into the vehicle steering system.

Some examples of less stable steering systems include standard highway-type vehicles with little or no positive caster or overpowered steering systems and various types of motor vehicles using offset wheels and/or oversized tires. Overpowered steering systems override any return or centering forces so strongly that driver feel for the center position is virtually eliminated. Zero or negative caster deprives the steering system of the centering forces discussed below with regard to positive caster. The destabilizing effects of offset wheels and/or oversized tires involve a more complex interaction of forces. Offset wheels are offset from the pivotal wheel mounting at the kingpin and can produce turning moments about the kingpin. Road forces acting along the outer portions of the extra-wide tread of oversized tires can also generate turning moments about the kingpin. These turning moments can lead to instability by dramatically multiplying any force tending to turn the steerable wheels away from center. Furthermore, offset wheels sometimes have a tendency to turn away from center without driver input, a tendency which can be aggravated by either positive or negative wheel caster. Since these destabilizing forces are magnified by speed, vehicle steering with offset wheels can be extremely difficult and actually unsafe at highway speeds.

The ideal situation is one where the steering system inherently causes the vehicle to travel in an unswerving straight line unless the driver intentionally turns the vehicle in another direction. Thus, stable steering systems require relatively little attention from the driver as the vehicle progresses along a straight path down the roadway. In other words, from a steering standpoint, the stable vehicle should not respond to anything but the driver's steering commands and those commands must be of sufficient magnitude to overcome the resistance to turning away from center. In the absence of a steering input by the driver, the vehicle should literally do nothing but progress straight ahead.

In the past, vehicles that were inherently stable usually employed a generous positive caster, among other things, to achieve straight or true track characteristics. While positive caster is desirable in some respects, it is not without compromise over the full steering spectrum. For example, the adverse effects of strong, gusty crosswinds are usually more pronounced on vehicles with positive caster. As its name would imply, the vehicle tends to caster toward the side it is being pushed by the wind. Similarly, a high crown at the center of the roadway will cause vehicles to caster toward the edge of the roadway, that is, in the downhill direction from the crown. These two adverse effects are some of the negative features of achieving steering stability through generous amounts of positive caster. On the plus side, except under the foregoing conditions or where offset wheels are used, motor vehicles with positive caster are less fatiguing to drive over long distances and are safer and more controllable at highway speeds. One reason such vehicles are more controllable is that by tracking straight, virtually no driver effort is required to keep the vehicle from swerving unless the foregoing extraneous forces are present.

In marked contrast, weak or soft centering systems, such as those employing little or no positive caster, excessive power steering, and/or offset wheels, change direction almost continuously so that constant driver manipulation is required for straight tracking of the vehicle. This kind of steering uses up more of the driver's energy than is generally realized and makes a long drive much more fatiguing. Such weak systems are also more susceptible to unintentional driver steering inputs, such as unstable driver-induced oscillations. Single car accidents have been caused by such adverse driver inputs simply because the overly soft directional stability of the vehicle was not sufficient to resist an upset steering input initiated unintentionally by the driver.

Centering devices of the prior art have been used primarily on specialty vehicles as illustrated by the Quayle U.S. Pat. No. 3,056,461 of Oct. 2, 1962, and the Schwenk U.S. Pat. No. 3,583,515 of June 8, 1971. Quayle shows a power steering mechanism for an industrial truck in which a double-acting spring assembly returns a traction wheel to its straightforward position upon removal of fluid pressure from a hydraulic steering ram. Schwenk shows a double-acting air pressure assembly for returning a steering axle to its center position upon removal of forces serving to rotate the axle away from center. The two devices are also quite similar in that both bias two piston components away from each other against respective stops near each end of a cylinder component. Thus, the spring of Quayle and the pressure chamber of Schwenk are both located between the piston components. The center position of these prior art devices is fixed at the time of installation.

Bishop U.S. Pat. No. 3,333,863 of Aug. 1, 1967, is of interest as showing a wheel stabilizer with a spring arrangement for counteracting torque around the kingpin due to the vehicle weight. The spring of FIG. 3 includes hydraulic dampening. However, the spring arrangement is single-acting and the device is not employed as a centering mechanism.

In an attempt to overcome some of the problems discussed above, Henry-Biabaud U.S. Pat. No. 3,171,298 of Mar. 2, 1965, No. 3,373,631 of Mar. 19, 1968, and No. 3,426,612 of Feb. 11, 1969, suggest that a cam mechanism may be mounted directly on the steering column to help center the steering wheel. Because such a system is located on the steering wheel side of the steering gear assembly, spurious steering inputs from the steering column and/or from a power steering unit are magnified before reaching the steerable wheels by a factor corresponding to the vehicle steering ratio, which may be as large as 18:1 or greater. As a result, relatively weak spurious inputs can be transformed into strong wheel positioning forces which may adversely affect the stability of the vehicle. One such spurious input is that generated when the steering wheel overshoots its center position as discussed in the latter two Henry-Biabaud patents referenced above. Another drawback of the Biabaud type centering device resides in the absence of a means for the driver to quickly and easily trim the center position of the steering system in response to varying road conditions and steering system characteristics.

A still further drawback is that spurious forces transmitted from the roadway through the steerable wheels affect substantially the entire steering assembly before encountering any stabilizing resistance from either the steering wheel or the Biabaud type of centering device. The transmission of these spurious forces between the wheels and the steering column cause the inter-connected components of the steering assembly to repeatedly oscillate between states of tension and compression. Such oscillations cause wear and slack in ball joints and other connections and have long been considered a primary source of stress fatigue which may lead to premature failure of various steering assembly components.

DISCLOSURE OF THE INVENTION

To properly compensate for the various steering forces encountered during operation of a vehicle, a centering compensator should have the following features:

(a) A dynamic resistance to turning movement away from a preselected center position, the amount of resistance force being sufficiently large to prevent such turning movement in response to spurious inputs from either the wheels or the steering column side of the compensator.

(b) A return force toward the center position from either side of center, the amount of return force being sufficiently large to override spurious steering inputs tending to cause turning movements away from center.

(c) Free return to the center position from either side of center.

(d) A remotely operable trimming means to permit the driver to change the preselected center position during vehicle operation so as to compensate for changes in the level or direction of extraneous forces tending to cause spurious off-center movement of the vehicle.

(e) A fail-safe mode rendering the centering compensator inoperative so that it in no way affects movement of the steering system if the vehicle's power steering unit has failed or is otherwise inoperative.

In addition to the foregoing features, the combination of which is preferred, certain optional features may also be desirable, depending upon the steering characteristics and design objectives of a specific vehicle. These optional features include:

(f) A static resistance to initiation of turning movement away from either side of the center position, the amount of static resistance being sufficiently small to allow intentionally created turning inputs to be transmitted to the vehicle's steerable wheels or other steerable member.

(g) Means for varying the amount of dynamic resistance in response to the rate of turning movement away from either side of the center position.

(h) For improved control and greater flexibility, the return force, the static resistance and/or the dynamic resistance may be controllably variable, with means provided for affecting such control.

By reason of the above, a principal object of the present invention is to automatically eliminate inputs to a vehicle steering system, except those intentionally created by the driver, and to thereby reduce considerably the driver inputs required to maintain a straight ahead course for the vehicle. The present invention thus off-sets spurious steering forces with an opposing force sufficient to keep the steerable wheels or other steerable member in the center position for maintaining straight ahead vehicular travel. The invention comprises a centering compensator having a center position corresponding generally to the center position of the steering system. However, the center position of the compensator is remotely adjustable relative to the vehicle frame to permit the driver of the vehicle to change and reset the center position of the steerable member to compensate for new or changed steering forces that would otherwise cause the vehicle to deviate from its straight ahead course. Such changes in the center position of the steering system may be necessitated by component wear or changes in the forces acting upon the vehicle such as those caused by environmental conditions or by the conditions of the roadway. Even a change of tires can cause a change in the true center position. Remote adjustment permits the center position maintained by the compensator to be changed during the course of vehicle operation from a location that is "remote" relative to the location at which the compensator is connected to the steering system of the vehicle.

When connected to weak or soft steering systems, the invention provides the driver with a positive touch control not heretofore attainable. There is a distinctive feel for the center steering position, as well as for away from center steering movements. Thus, the sense of touch is added to the visual sense to aid control of the vehicle and reduce driver fatigue, and positive control for previously unstable steering systems is provided. The preferred embodiments of the invention have all of the features (a) through (e) listed above, namely, a resistance to steering movement away from center sufficient to overcome spurious steering inputs; a return force to center; free return to center; trimming means for remote adjustment of the center position; and a fail-safe mode disabling the compensator when the vehicle's power steering unit is inoperative. A preferred embodiment may also include one or more of the optional features (f) through (h), such as static resistance to off-center steering movement; a variable return force; and/or means for controllably varying the return force and/or off-center resistance. As a further optional feature, an adjustable static resistance to initiation of off-center steering movement may be provided. This adjustment provides for different levels of steering force to initiate or "break away" into a steering movement away from center. Such force is referred to hereafter as "break away force". Different levels of break away force may be appropriate for different steering systems on the same or different types of vehicles. The invention is also capable of generating sufficient compensating forces to properly control and recenter offset wheels with oversized tires.

Although the present invention is particularly useful as a centering mechanism for motor vehicles, it can be employed to automatically position any steerable member moveable to either side of a preselected position. For example, the compensator can keep an outboard motor centered so that the boat follows a straight course over the water in the presence of spurious steering forces produced by wind and wave action. The compensator can also be used to center such steerable members as the rudders of ships or airplanes and the tongues of tandem trailers or railway cars. The invention is useable with both powered and non-powered steering systems, the level of compensating forces provided usually being less in compensators for vehicles without power steering.

The manner in which the present invention accomplishes the foregoing objectives and advantages will now be described. The centering unit of the compensator is connected between the steering system and the frame of the vehicle in a position that allows the steerable member to move through its full range of steering movements while always providing sufficient leverage for the compensator to return the member to the center position producing straight ahead travel of the vehicle. The steering system connection may be made to any steering system component providing appropriate range and leverage, such as the tie rod which joins the front steerable wheels of a highway vehicle. The frame connection may be made to any component serving as a fixed mounting relative to the steering system and this component may be a fixed axle or some other part carried by the vehicle frame instead of an actual frame member.

The compensator comprises a housing assembly enclosing a chamber of sufficient size to allow for positioning of a cam actuator therein. The cam actuator has an outer cam surface extending around at least a portion of its periphery and is mounted for rotation with a support shaft rotatably supported within the housing chamber. A portion of the support shaft extends beyond the housing and joins a centering lever, with the centering lever also being attached to a centering rod. The centering rod is, in turn, attached to the vehicle's tie rod for movement therewith.

A cam follower is also positioned within the housing chamber and includes a follower lever pivotally mounted about a journal opening of sufficient size to allow a support shaft as well as an eccentric bearing assembly to extend therethrough. The compensator further comprises a centering piston arranged for reciprocal movement within a centering cylinder formed in the housing. A drive link is attached to the pivotal follower lever and includes a free-end portion in contact with a concave, cone-shaped rear wall of the centering piston. A cam roller is also attached to the follower lever and confronts the cam actuator so as to ride on its outer cam surface. The cam roller is of a size and shape to allow the roller when centered to contact simultaneously opposite side walls of a centering depression formed in the outer cam surface. During operation, pressurized fluid delivered to the centering cylinder biases the centering piston toward the drive link. Movement of the centering piston serves to move the drive link and pivot the attached follower lever about its supporting shaft. As the lever pivots, it causes the attached cam roller to engage the cam surface of the cam actuator. When the actuator is in its center position, the roller is pressed into the centering depression so that contact between the cam roller and the sidewalls of the depression generates a resistance force which resists movement of the cam actuator and of the steering system tie rod to which the actuator is attached. By selectively varying the pressure within the centering cylinder, the pressure between the cam roller and cam actuator may be varied, thereby varying the resistance to off-center movement of the steering system.

Spurious steering input forces which attempt to move the tie rod in either direction are resisted by corresponding resistance forces generated by interaction between the cam actuator and cam follower. Only when intentional steering input forces exceed the preselected break away level of resistance provided by the compensator will the tie rod generate sufficient rotational force on the cam actuator to rotate it about its rotational axis and move the centering depression relative to the cam roller. After rotational movement of the cam actuator is initiated, the tie rod force required to sustain movement is a function both of the shape of the cam surface along the sides of the centering depression and of the return force provided by other centering phenomena acting on the steering system, such as positive wheel caster. In a preferred embodiment, the shape of the centering depression and other compensator parameters are chosen so that a total break away steering force of at least 20 pounds, preferably at least 50 pounds, and more preferably at least 70 pounds must be applied to the tie rod in order to initiate break away turning movement of the steerable wheels at vehicle speeds above about 35 miles per hour. For city driving at vehicle speeds of about 35 miles per hour or less, the break away force required is preferably lowered to below about 20 pounds, more preferably below about 10 pounds, at the tie rod.

If the steerable wheels are provided with positive caster, the sides and shoulders of the depression may be faired into a circular outer cam surface (which provides no supplemental cam return force) using a shape which provides a decreasing level of cam return force until the caster return force, which increases in proportion to turning angle with positive caster, is of sufficient magnitude to alone provide a rapid return of the steering system toward the center position. The cam return force need not go to zero, but instead may be effective over the entire range of turning angles, which for highway vehicles is usually limited to 45° on either side of the centered wheel position (the "0°" position). Preferably, there should be sufficient positive caster for the cam force to be effective over the range of 0°–30°, more preferably 0°–15° and most preferably 0°–10° on either side of center.

In other words, the self-centering return forces provided by the positive wheel caster of standard motor vehicles follows a force curve that may provide relatively little, if any, centering force in the straight ahead position or at small turning angles immediately adjacent to the straight ahead position. Thus, the cam of the present invention is shaped or "cut" so as to provide a supplemental return force which blends with the return force provided by the normal geometry of the front end of the vehicle, which may or may not include a power steering unit, to increase substantially the centering return force available at and immediately adjacent to either side of the straight ahead position of the steerable wheels. At greater turning angle positions, the supplemental cam force tapers off as positive caster return force increases.

It is of course possible to provide higher levels of caster return force at and near the center position, but such levels of positive caster make driving in the city very fatiguing because of the necesssity of frequently turning the vehicle through large turning angles. Although such high levels of caster can be overcome by adding or increasing the level of power steering, such power steering systems significantly increase the cost and complexity of the steering assembly.

The turning resistance provided by the cam return force at or near the centered wheel position is sufficiently large to resist spurious steering inputs generated either by the driver or by an overactive power steering system. With prior art devices, such as those of Henry-Biabaud, spurious wheel movements may be generated by interactions between the steerable wheels and the roadway because of slack in the steering system and, where used, because of the dead space travel of the power steering valve before it opens the fluid ports of the power steering unit. The compensator of the invention resists spurious wheel movements and prevents such spurious inputs from reaching the steering gear and other steering components located between the tie rod and the steering wheel within the driver compartment of the vehicle. Furthermore, the point of connection relative to the steering gear, the shape of the centering depression and the resistance to off-center movement of the cam actuator are such that overrunning or overshooting of the centered, straight ahead (neutral) position is avoided. Thus, in addition to holding a weakly centered steering system at its neutral position, the invention provides positive restraint against movement past the neutral position when the steering system is returned to center from a turning movement to either side.

Because the compensator is located outward of the steering gear on the slow side of its ratio, the steerable wheels are maintained in their straight ahead position irrespective of any spurious inputs or mechanical slack that may be present in the inward, fast ratio portion of the steering assembly. In the absence of the present invention, such spurious inputs to and/or mechanical slack in the steering assembly require almost constant manipulation of the steering wheel by the driver and make it almost impossible to hold the vehicle on a true straight ahead course.

The present invention is an improvement over that shown in copending application Ser. No. 093,968 in that the mechanical components of the compensator are less complex and may therefore prove to be more reliable. In addition, the present invention allows the use of a much smaller fluid reservoir and a less complex fluid system which may be readily operated by the level of vacuum available from a combustion engine.

In order to simplify the foregoing discussion, it has been assumed that the return force and the resistance force provided by the compensator are substantially equal. However, this is not necessary and, in fact, is not the case with certain more sophisticated embodiments of the invention. For example, the fluid system associated with the centering cylinder may provide fluid resistance for turning movement away from center while allowing completely unrestricted fluid flow for return to center. Where the two are not equal, it is preferably the cam return force that is matched to a positive caster return force in designing the compensator.

Another feature of the present invention is that the level of resistance to movement away from center may be controllably variable so as to be adjusted either by a hand mechanism operable by the driver or by a speed control mechanism responsive to the speed of the vehicle. Because of the large turning angles needed for city driving, it is preferable that the level of turning resistance be relatively low at speeds of 35 mph or less. On the other hand, at highway speeds, it has been found to be less fatiguing to have a relatively high level of turning resistance (80–150 pounds) at small turning angles away from center, preferably 0°–5°, more preferably 0°–3°, and most preferably within one degree on either side of center. For these purposes, the turning resistance of the present invention is readily adjustable to provide a low level at low speeds and a high level at speeds of about 35 mph or greater. In this regard, the centering compensator is much less complex than prior art arrangements, which include combinations of high positive caster near the center position and complex power steering systems for varying the level of power assist from a low assist level at small turning angles to a high assist level at large turning angles.

The turning resistance of the present invention is provided by delivering fluid under pressure to the centering cylinder from a fluid pressure control device which may take a variety of forms and may be either pneumatic and/or hydraulic. Preferably, a vacuum over hydraulic device is employed, wherein air and hydraulic liquid containing cylinders are mounted end-to-end. An air piston arranged for movement through the air cylinder includes an elongated drive rod extending into the hydraulic cylinder. As the air piston is caused to move through the air cylinder toward the adjacent hydraulic cylinder, the drive rod expells liquid from the hydraulic cylinder into a liquid transfer system leading to the centering cylinder. A vacuum generated by a conventional vacuum source, such as the inlet manifold of a combustion engine, may be employed so that ambient pressure will drive the air piston through its cylinder.

While a vacuum over hydraulic control device is preferable, it is also within the scope of the present invention to provide any type of pressure control device for controlling the pressure of a fluid in the centering cylinder. For example, a pressure accumulator of the type discussed in co-pending application Ser. No. 093,968 may be employed for storing and providing fluid under pressure to the centering piston. Regardless of the type of pressure control device employed, the device should generate sufficient pressure to return the cam roller to its center rest position in the centering depression of the cam actuator upon cessation of intentional steering inputs. The pressure control device should also constantly bias the centering piston into engagement with the drive linkages and the cam follower into engagement with the cam surface of the cam actuator so that there is no slack at any time in the linkages when the compensator is activated.

The fluid transfer system should include passageways of sufficient size to provide rapid flow of hydraulic fluid between the pressure control device and the centering cylinder as the steerable member returns to its center position. A differential pressure valve may be provided in the liquid transfer system of a further, preferred embodiment to establish an additional level of static resistance to movement of the centering piston, thereby requiring a steering force of sufficient magnitude to overcome the total resistance to initial fluid flow represented by the dynamic pressure of the pressure control device combined with the static pressure required to open the differential valve. Furthermore, an orifice may be positioned in series with the differential pressure valve to restrict the rate of fluid flow out of the centering cylinder and hence the rate of movement of the steerable member away from its center position. The orifice also functions to vary the level of turning resistance in response to the rate of fluid flow out of the centering cylinder after break away pressure has been achieved. To ensure free return flow in a fluid transfer system employing the differential pressure valve and/or a flow restricting orifice, a bypass line containing a check valve is placed in parallel to the pressure valve and/or orifice.

A bypass line and dump valve is positioned between the centering cylinder and pressure source so that the centering system of the present invention can be deactivated upon loss of power steering simply by dumping system pressure. Additional bypass lines may be provided with respective valves for dumping system pressure under various other conditions.

A particularly important feature of the present invention is the provision of a remotely operable trimming means for controllably varying the preselected center position of the steerable member to be maintained by the compensator. The actuator for the remotely adjustable trimming means may be comprised of a reversible electric motor assembly supported by the vehicle frame. The electric motor assembly includes drive means for reciprocating a trim rod connecting the motor assembly to a trim lever, which in turn is connected to the support shaft for the pivoted lever of the cam follower assembly carried within the compensator housing. Upon selective actuation of the electric motor via an electrical system with a switch means conveniently positioned to the vehicle operator, the trim rod is caused to advance or retract relative to the motor assembly. Movement of the trim rod causes the attached trim lever and the support shaft of the follower lever to rotate about the longitudinal axis of the support shaft. Because of the eccentric bearing assembly positioned between the support shaft and the follower lever carrying the cam roller, rotation of the support shaft produces longitudinal movement of the follower lever, thereby altering the rest position of the cam roller relative to the rotational axis of the cam actuator. By altering the rest position of the cam roller, the rest position of the cam depression also rotates about the rotational axis of the actuator, creating a new center position for both the cam actuator and the attached steerable member of the vehicle.

While a reversible electric motor is one preferred means for affecting the trimming operation, it is also within the scope of the present invention to employ any type of remotely controllable actuator for the trimming means. For example, hydraulic actuators may be used similar to those disclosed in co-pending application Ser. No. 093,968. In particular, the trim rod may be connected to a trim piston reciprocally carried within a hydraulic trim cylinder mounted on the vehicle frame. Hydraulic fluid from a fluid system accumulator or other pressurized fluid source is then used to create differential pressure in either direction accross the trim piston. The direction and level of differential pressure may be controlled by inlet and outlet orifices in combination with solenoid stop valves.

The trimming piston is connected to one end of the trimming rod and, in a preferred embodiment, the other end of the trimming rod serves as the connecting linkage to the trim lever. Since rotation of the follower support shaft by the trim lever will move the cam actuator and connected tie rod while the cam roller remains centered, movement of the trimming piston within its chamber changes the preselected position of the steerable member. A liquid fluid is preferred because it is substantially incompressible as comparedd to a gaseous fluid and provides a locking capability without appreciable slack.

A liquid fluid is also preferred to provide effective viscous dampening and precise control of centering piston movement in accordance with the rate of fluid flow. A compressible fluid such as air would also reduce the effectiveness of the differential pressure valve since significant piston movement could occur before this valve opens. Where a liquid is trapped in the centering cylinder, the pressure valve provides substantially slack free centering since no significant centering piston movement can occur until the valve opens.

When the pressure valve is open, centering piston movement is controlled by the rate at which the liquid flows from the centering cylinder to the fluid reservoir. The level of steering force required to produce piston movement against the liquid is therefore a function of the differential pressure setting of this valve, system pressure downstream of this valve, and the flow rate of liquid through this valve once it opens. The invention includes means for controllably varying each of these parameters. Where the fluid is a gas, piston movement is also a function of fluid compressibility and control may not be adequate for many applications.

BRIEF DESCRIPTION OF THE DRAWINGS

The invention, both as to its structure and operation, may be best understood by reference to the following description of the best modes read in conjunction with the accompanying drawings in which:

FIG. 1 is a schematic diagram of a steering sytem illustrating installation of the invention between the frame and steering system of a motor vehicle.

FIG. 2 is a sectional view showing structural details of the centering unit of the invention.

BEST MODES FOR CARRYING OUT THE INVENTION

Figure 3:
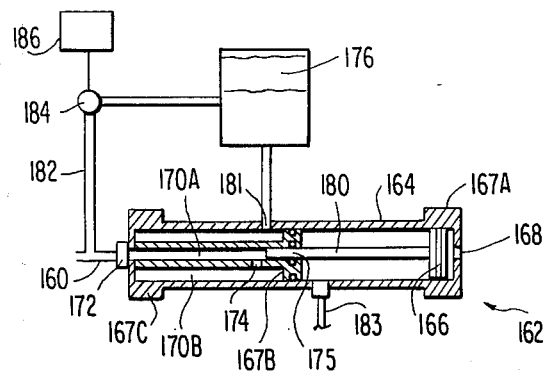
FIG. 3 is a sectional view of a pressure control system of the invention.

The centering compensator of the present invention comprises a centering unit, generally designated 8, which may be connected between the frame 9 and the tie rod 10 of a conventional motor vehicle as shown in FIG. 1 of the drawings. Intentional steering inputs by the driver are transmitted to the tie rod through a steering rod 11. The compensator includes a compensator housing 13 having a centering lever 14 extending from one portion and a trimming lever 16 extending from a further portion. The projecting end of the centering lever 14 is connected to the tie rod 10 by means of a connecting rod 18, while the projecting end of the trimming lever 16 is connected to the frame 9 by means of a trimming rod 19 and associated trim control mechanism 20. Trimming rod 19 includes a pivot joint 21 permitting limited pivotal movement of rod 19 in the pivotal plane of lever 16. The steering system components shown are conventional and include bell cranks 22—22 carried by knuckles 24—24 which support steerable wheels 26—26 for pivotable turning movement about a kingpin (not shown) mounted on the vehicle frame 9.

The components of the compensator 8 and the way in which they center and stabilize the vehicle steering system will now be described with reference to FIGS. 1, 2 and 3. It is to be understood that certain of the components described are connected together by appropriately sized fluid conduits and that those conduits are represented by the lines interconnecting the components as shown. As shown in FIG. 1, compensator housing 13 is bolted to a support plate having flanges 15A and 15B attached to frame 9. Housing 13 includes an outer shell 27 enclosing and defining an enlarged interior chamber 28. Interior chamber 28 includes a substantially cylindrically-shaped sub-chamber 30 of sufficient size to receive a substantially disk-shaped cam actuator 32. An outer surface portion of cam actuator 32 is formed with a smooth-walled cam surface 33 having a centering depression of particular cross-sectional configuration. Cam actuator 32 is supported on a cam shaft 36 rotatably mounted in housing 13 by conventional bearing assemblies, not shown for purposes of simplicity.

During operation of the vehicle, intentional steering input forces transmitted from a steering wheel, not shown, to steering rod 11 initiate predetermined movements of tie rod 10. Because centering lever 14 is connected to tie rod 10 via centering rod 18, pressure on tie rod 10 is transmitted through lever 14, cam shaft 36 and cam actuator 32, with the pressure seeking to rotate cam actuator 32 about an axis of rotation coinciding with the longitudinal axis of cam shaft 36. Because cam actuator 32 is directly connected to tie rod 10, it becomes possible to maintain tie rod 10 in a predetermined position by restraining cam actuator 32 against rotation. Furthermore, by maintaining tie rod 10 in a predetermined position, attached wheels 26 are also restrained against rotation away from a predetermined position, preferably chosen to correspond to straight ahead movement of the vehicle.

As shown in FIG. 2, cylindrically-shaped sub-chamber 30 defines an end of interior chamber 28. Interior chamber 28 further includes an elongated sub-chamber 38 extending between sub-chamber 30 and a further, cylindrically-shaped chamber defining a cylinder 40. A cylindrically-shaped centering piston 412 having a diameter substantially corresponding to a diameter of cylinder 40 is reciprocally disposed within cylinder 40 for a purpose which will become clear. In a like manner, a cam follower assembly generally indicated at 43 is positioned within elongated sub-chamber 38. Cam follower assembly 43 includes an intermediate lever 44A pivotally mounted near the center about a shaft 45 and pivotally attached at one end to a drive link 44B via a conventional pivot pin assembly. Cam follower assembly 43 further includes a cam roller 44C rotatably mounted on the other end portion of intermediate lever 44A remotely positioned from drive link 44B in the embodiment of FIG. 2. Cam roller 44C preferably includes a substantially cylindrically-shaped outer surface compatible in configuration to centering depression 34 formed in cam actuator 32.

Figure 6:
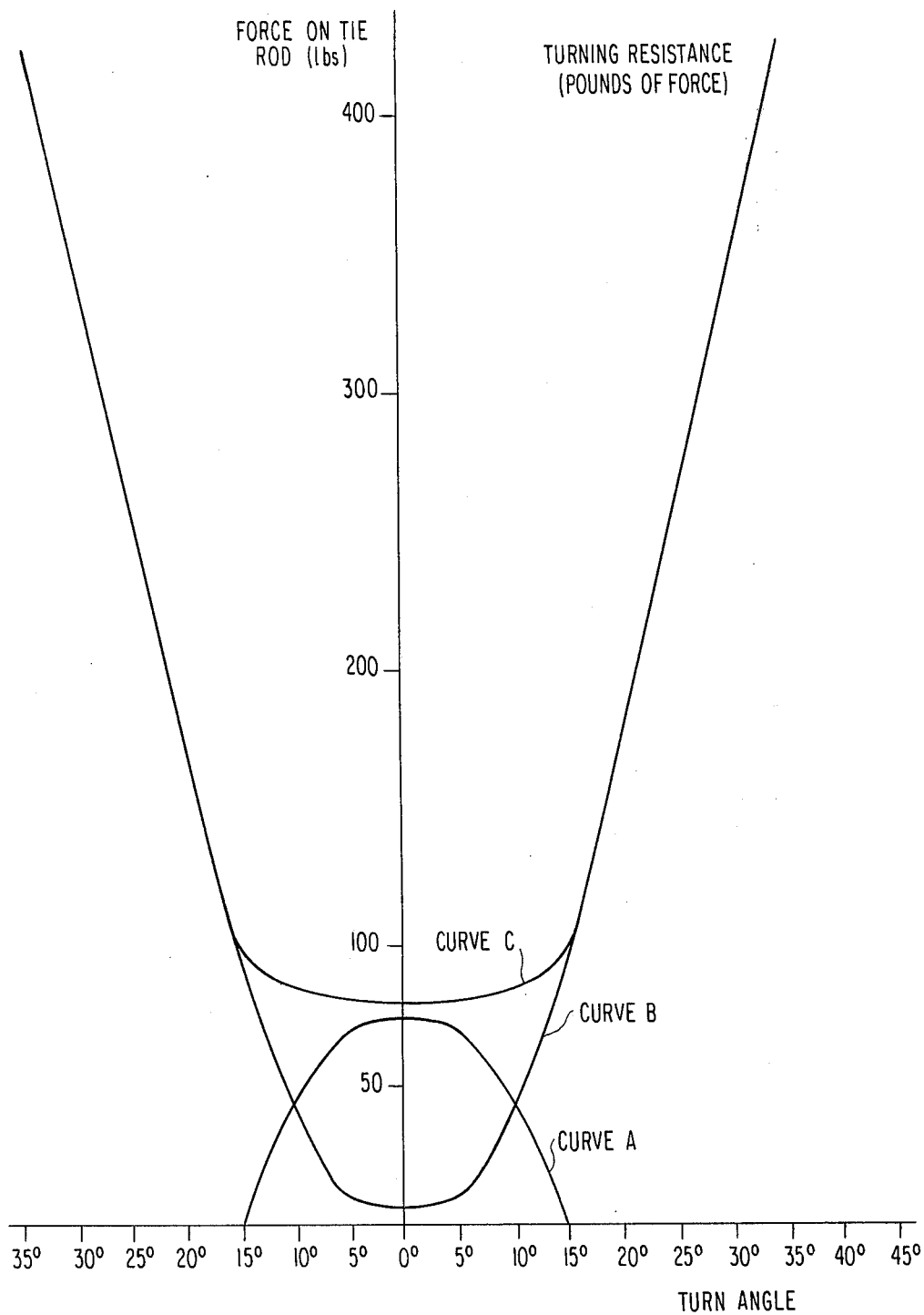
FIG. 6 is a curve plotting the turning resistance of the vehicle wheels as a function of the angle of rotation of the vehicle wheels from a predetermined center position.

In a preferred embodiment, the shape of centering depression 34 and other compensator parameters are chosen so that a total break away steering force of at least 20 pounds, preferably at least 50 pounds, and more preferably at least 70 pounds must be applied to tie rod 10 to initiate turning movement of wheels 26 at speeds above about 35 mph. If, for example, steerable wheels 26 are provided with positive caster, the sides and shoulders of centering depression 34 may be faired into a circular outer surface of cam actuator 32 (wherein the circular surface provides no supplemental cam return force) using a cam depression shape which provides a decreasing level of cam return force until the caster return force, which increases in proportion to turning angle with positive caster, is of sufficient magnitude to alone provide a rapid return of the steering system toward the center position. By appropriately contouring centering depression 34, the cam return force generated by cam follower 43 need not go to zero, but instead may be effective over the entire range of turning angles, which for highway vehicles is usually limited to 45° on either side of the centered wheel position (the "0°" position). Preferably there is sufficient positive caster for the cam return force to be effective over the range of 0°–30°, more preferably 0°–15° and most preferably 0°–12° on either side of center as will become clear hereafter. The centering depression 34 is shaped or "cut" so as to provide a supplemental return force which blends with the return force provided by the normal geometry of the front end of the vehicle, which may or may not include a power steering unit. Interaction between the centering depression 34 of cam actuator 32 and cam follower 43 substantially increases the centering return force available at and immediately adjacent to either side of the straight ahead position of steerable wheels 26. At greater turning angle positions, the supplemental cam force tapers off as positive caster return force increases as shown in FIG. 6.

Referring again to FIG. 2, it is noted that intermediate lever 44A includes a journal opening of sufficient size to allow support shaft 45 as well as an eccentric bearing assembly 46 to extend therethrough. Support shaft 45 is preferably supported within housing 13 by conventional bearing assemblies, not shown for reasons of simplicity. Furthermore, support shaft 45 also includes a portion extending beyond housing 13 into engagement with trim lever 16, whereby pivoting movement of trim lever 16 about a longitudinal axis of support shaft 45 initiates rotation of shaft 45 and eccentric bearing 46 relative to intermediate link 44A for a purpose which will become clear.

Drive link 44B pivotally attached to link 44A is formed with a free, rounded end portion 48 adaptable for contacting a conically-shaped end surface 50 of centering piston 42. As centering piston 42 projects through cylinder 40 toward cam follower assembly 43, rounded end portion 48 of drive link 44B slides along end surface 50 and into an apex formed by a central portion of conical surface 50. Further projection of centering piston 42 in the direction of cam follower 43 serves to displace link 44B, causing attached intermediate link 44A to pivot about the longitudinal axis of support shaft 45 in a counter-clockwise direction as shown in FIG. 2. Such pivoting movement of link 44A serves to displace attached cam roller 44C toward centering depression 34. After centering piston 42 has moved a predetermined distance through cylinder 40 in the direction of cam follower 43, cam roller 44C enters centering depression 34 and eventually contacts the opposite side walls thereof. Centering piston 42 functions to press cam roller 44C into surface contact with centering depression 34 with a force which seeks to restrain cam actuator 32 from rotating in either direction about the longitudinal axis of cam shaft 36.

In order to move centering piston 42 through cylinder 40 into engagement with cam follower 43, hydraulic fluid is selectively introduced into cylinder 40 via an inlet port 51 extending through a wall portion of cylinder 40 preferably located on an opposite side of centering piston 42 from cam follower 43. The hydraulic fluid is supplied by a fluid pressure control device 162 connected to port 51 via a fluid conduit system 160. Preferably, pressure control device 162 constitutes a vacuum over fluid device best shown in FIG. 3. Pressure control device 162 includes an elongated chamber having end walls 167A and 167C. The chamber is divided into an air cylinder 164 and a pair of concentrically disposed fluid cylinders 170A and 170B by means of a dividing wall 167B extending through an intermediate portion of the elongated chamber. An air piston 166 is disposed within air cylinder 164 for reciprocal movement between end wall 167A and dividing wall 167B, with a vent 168 formed through wall 167A to allow air to be admitted into and expelled from cylinder 164 as piston 166 reciprocates therein.

In a like manner, each of the concentrically disposed fluid cylinders 170A and 170B extends between dividing wall 167B to the further end wall 167C. A fluid port 172 formed through end wall 167C provides a fluid connection between conduit 160 and an interior end portion of fluid cylinder 170A. Finally, an opening 174 extends through a common cylinder wall dividing cylinders 170A and 170B at a location substantially adjacent to dividing wall 167B, thereby providing a continuous fluid passageway between cylinders 170A and 170B. Pressure control device 162 further includes a pusher rod 180 which extends from piston 166 through opening 175 in dividing wall 167B and into fluid cylinder 170A. Hydraulic fluid is supplied to pressure control device 162 from a hydraulic reservoir 176 in fluid communication with a port 181 formed in a side wall of fluid cylinder 170B. An air hose 183 extends from a port formed in cylinder 164 to a source of vacuum, such as the inlet manifold of a combustion engine of the vehicle. Of course, any vacuum source may be employed for operating pressure control device 162.

During operation of pressure control device 162, vacuum generated by the engine inlet manifold draws air from cylinder 164 via air line 183. As the pressure within cylinder 164 between piston 166 and dividing wall 167B decreases, a pressure differential is created across piston 166. As a result, ambient air entering cylinder 164 via vent 168 functions to drive piston 166 toward dividing wall 167B. At the same time, piston 166 presses attached pusher rod 180 through inner fluid cylinder 170A, with rod 180 expelling hydraulic fluid from cylinder 170A into fluid conduit 160. As pusher rod 180 advances through inner cylinder 170A toward end wall 167C, it covers opening 174 and effectively blocks the flow of hydraulic fluid between cylinder 170B and cylinder 170A so as to pressurize and displace the trapped fluid into conduit 160. The hydraulic fluid displaced from inner cylinder 170A by rod 180 travels through conduit 160 and enters cylinder 40 via port 51. As hydraulic fluid fills cylinder 40, it serves to project centering piston 42 into contact with drive link 44B. As additional hydraulic fluid enters cylinder 40 via port 51, piston 42 and drive link 44B are caused to move away from port 51, with drive link 44B functioning to pivot intermediate lever 44A about the longitudinal axis of support shaft 45 in a counterclockwise direction in FIG. 2. This pivoting movement of link 44A serves to press attached cam roller 44C toward aligned depression 34. Cam roller 44C eventually enters centering depression 34 and continues to the bottom of depression 34 where it comes to rest against opposite side walls thereof. At this point, contact force between roller 44C and depression 34 generated by pressure control device 162 effectively prevents rotation of cam actuator 32 relative to cam follower 43 in either a clockwise or counterclockwise direction. By selectively varying the pressure within cylinder 40, the contact force between cam roller 44C and the side walls of centering depression 34 may be varied, thereby varying the resistance to off-center movement of the steering system.

Even though contact between roller 44C and depression 34 prevents rotation of cam actuator 32, an intentional steering input force above a predetermined or "break away" level will initiate rotation of cam actuator 32. In particular, a sufficiently strong steering force transmitted through steering rod 11, tie rod 10 and cam shaft 36 to cam actuator 32, initiates rotation of cam actuator 32 in spite of the resistance provided by cam roller 44C, causing cam roller 44C to ride up an inclined side wall of depression 34 as cam actuator 32 rotates. Even though roller 44C is forced to ride up a side wall of depression 34, the resistance force transmitted from piston 42, through cam follower 43 still seeks to return roller 44C to a position of complete alignment with depression 34 in which roller 44C contacts both side walls of center depression 34. As a result, a continuous return force acting through cam actutor 32 and tie rod 10 attempts to return wheels 26 to their predetermined center positions. However, once cam actuator 32 rotates through a sufficient angle, roller 44C completely exits from depression 34 and the return force generated by pressure control device 162 may cease to have an effect on wheels 26, depending upon the shape or "cut" of the remaining portion of cam surface 33. At this point, roller 44C is equally adaptable for movement in either direction where the cut of cam surface 33 is substantially circular. As a result, the only force seeking to return cam actuator 32 to its original position is the positive caster acting directly on wheels 26.

As cam roller 44C rides up a side wall of centering depression 34, intermediate lever 44A pivots in a clockwise direction about the longitudinal axis of support shaft 45. This results in attached drive link 44B driving centering piston 42 in a return direction through cylinder 40, toward port 51. As centering piston 42 returns through clinder 40, it displaces the hydraulic fluid present in cylinder 40, with the fluid flowing through conduit 160 and returning into inner hydraulic cylinder 170A. As the hydraulic fluid re-enters cylinder 170A, pusher rod 180 is displaced through fluid cylinder 170A toward cylinder 164, driving attached piston 166 through cylinder 164 toward end wall 167A, as shown in FIG. 3. As hydraulic fluid drives push rod 180 through cylinder 170A, opening 174 is eventually uncovered, allowing hydraulic fluid to flow from cylinder 170A into concentrically disposed cylinder 170B.

Once the sufficiently strong steering input force transmitted through steering rod 11 ceases to act on steering rod 11, the positive caster of wheels 26 automatically seeks to return wheels 26 toward their original, center tracking positions. Because any return movement of wheels 26 is transmitted to cam actuator 32 via entering lever 14, connecting rod 18 and tie rod 10, return movements of wheels 26 cause cam actuator 32 to rotate toward an orientation wherein depression 34 intersects the path of travel of cam roller 44C. As soon as an edge of centering depression 34 intersects cam roller 44C, vacuum powered control device 162 functions to press cam roller 44C into depression 34 in the manner discussed hereabove. As soon as cam roller 44C again re-enters centering depression 34, the return force generated by pressure control device 162 becomes effective. This force seeks to re-establish the position wherein cam roller 44C contacts the opposite side walls of depression 34, with such a position corresponding to a straight ahead orientation of wheels 26. Any additional rotation of cam actuator 32 beyond the position of alignment between cam roller 44C and centering depression 34 is resisted by interaction of roller 44C and the opposite wall of depression 34. In effect, the cam and follower arrangement of the present invention significantly reduces the chance of over-steering by providing an increasing resistance to movement in either direction from the center position preferably corresponding to straight ahead movement of wheels 26.

If it becomes essential to disconnect compensator 8, as in the event of disconnection or failure of the power steering, a dump system is easily actuated to circumvent pressure control device 162 and re-route hydraulic fluid from cylinder 40 directly into hydraulic reservoir 176. A bypass conduit 182 extending between fluid conduit 160 and reservoir 176 includes a normally closed, one-way valve assembly 184 attached to a control actuator 186 which may comprise a conventional two position switch located for convenient actuation by the vehicle operator. If and when it becomes necessary to disconnect compensator 8, the operator merely actuates switch 186 from a first to a second position, opening one-way valve 184 and allowing hydraulic fluid to flow from conduit 160 through bypass conduit 182 and into hydraulic reservoir 176. It is also considered within the scope of the present invention to employ a control actuator which takes the form of an automatic sensor capable of sensing a predetermined condition such as failure of the power steering pump and automatically opening the one-way valve 184 in response thereto.

As discussed in the summary portion of the present application, a particularly important feature of the present invention is the provision of a remotely operable trimming means for controllably varying the center or any preselected position of the steerable wheel as achieved by interaction of cam follower 43 with cam actuator 32. The actuator for the remotely adjustable trimming means may be comprised of a reversible electric motor assembly 20 supported by the vehicle frame 9. The electric motor assembly 20 includes a drive means for reciprocating trimming rod 19 and trim lever 16 attached, in turn, to cam follower support shaft 45. A conventional switch actuator 29 electrically connected to reversible motor 20 is conveniently positioned in the vehicle cab for actuation by a vehicle operator or the like. Switch 29 preferably includes an initially off position 29A, a forward position shown in phantom at 29B and reverse position also shown in phantom at 29C, respectively. Upon selective actuation of switch 29 from off position 29A to forward position 29B, reversible electric motor 20 is activated to advance trim rod 19 in a first direction with respect to motor 20 as indicated by arrow R. Electric motor 20 may employ a conventional worm screw gear train or the like, not shown, for advancing and retracting trimming rod 19 through electrical motor 20. If it is desired to retract trimming rod 19 through electric motor 20 in the direction of arrow S, switch 29 is merely moved from off position 29A to reverse position 29C, thereby causing trimming rod 19 to move in the direction indicated by arrow S.

Movement of trimming rod 19 in either of the opposite directions indicated by arrows R or S results in attached lever 16, support shaft 45 and attached eccentric bearing assembly 46 rotating in either a clockwise or counterclockwise direction relative to the longitudinal axis of support shaft 45. Because bearing 46 is of an eccentric cross-sectional configuration, rotation of bearing 46 serves to alter the position of intermediate lever 44A as well as attached cam roller 44C within elongated chamber 28.

In particular, clockwise or counter-clockwise rotation of shaft 45 and attached eccentric bearing 46 functions to increase or decrease the distance between the axis of rotation of cam roller 44C and the longitudinal axis of shaft 45. As a result of the displacement of cam roller 44C, a new rest position of cam roller 44C is achieved relative to the rotational axis of cam actuator 32. By altering the rest position of cam roller 44C, cam actuator 32 is forced to rotate about its rotational axis until centering depression 34 is again aligned with cam roller 44C, creating a new center position for both cam actuator 32 and the attached steerable member.

While the embodiment of FIGS. 1 and 2 provides a centering piston 42 capable of reciprocal movement along a path extending substantially parallel to cam actuator 32, the present invention is not to be limited to the specific arrangement of centering piston, cam actuator and cam follower shown in FIG. 2. Rather, the present invention is directed to any arrangement of centering piston, cam follower and cam actuator capable of performing in the manner discussed hereabove. For example, in an alternative embodiment of FIGS. 4 and 5, a centering piston 42' is capable of reciprocal movement along a path toward or away from a cam actuator 32'. For purposes of simplicity, components employed in the embodiment of FIGS. 4 and 5 which are similar to those components employed in the embodiment of FIGS. 1 and 2 have been given similar numerals with the addition of a prime designation (') to avoid confusion.

Figure 4:
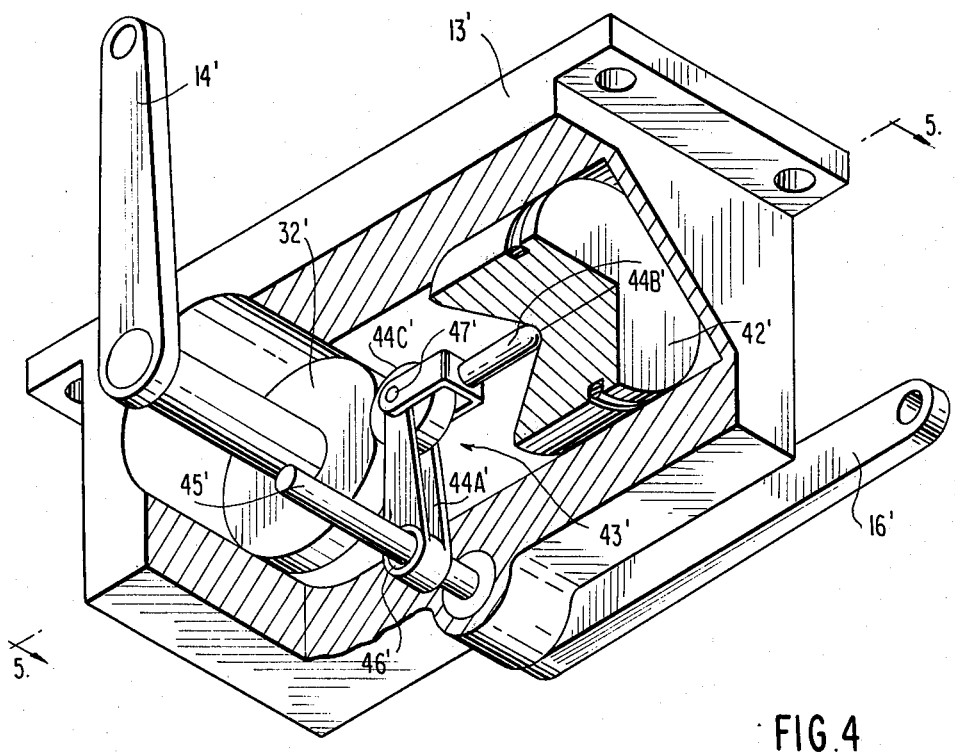
FIG. 4 is a partial sectional view of a modification of the centering compensator of the invention.
Figure 5:
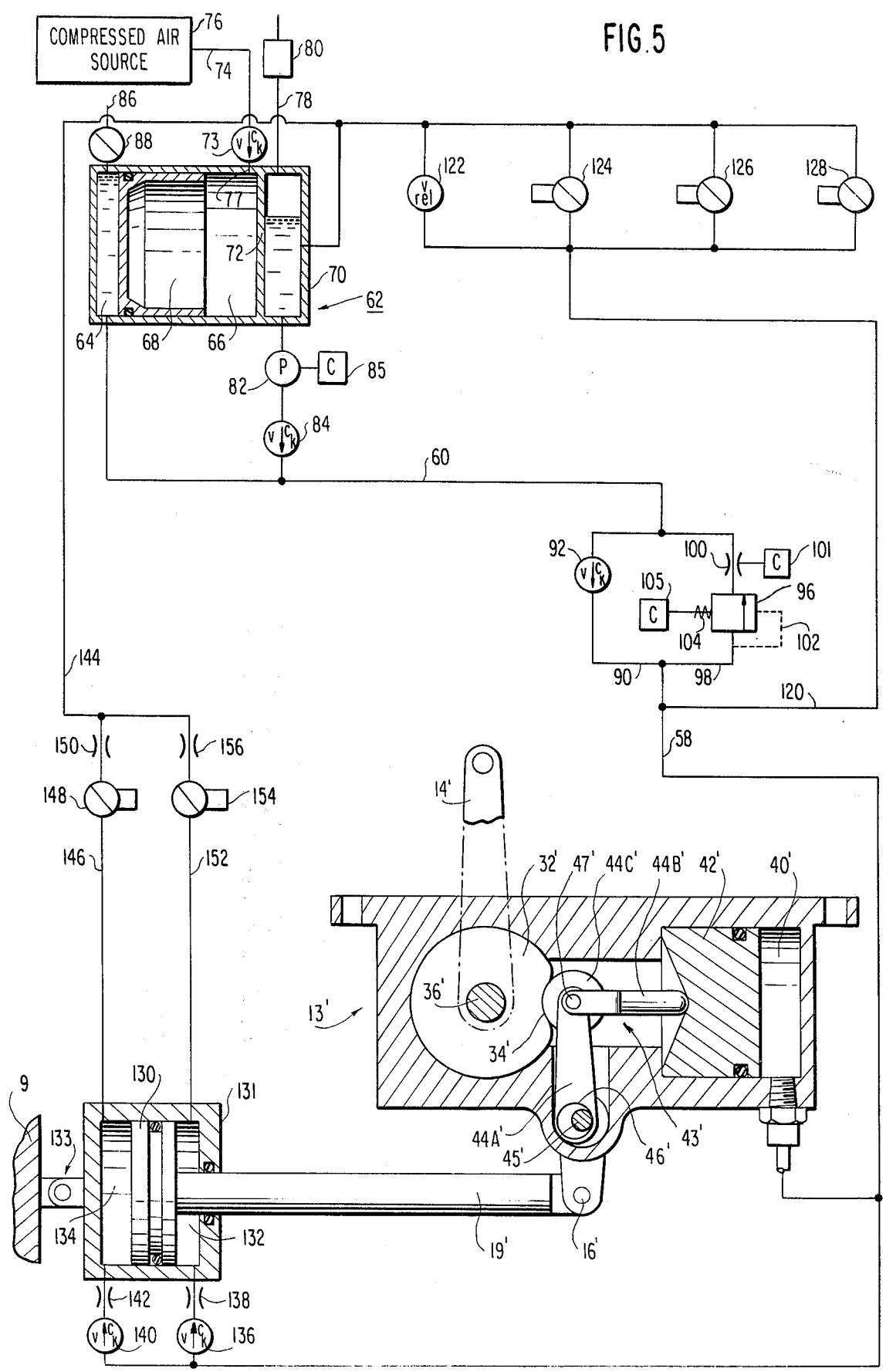
FIG. 5 is a sectional view of the modified centering compensator along lines 5—5 of FIG. 4, as well as a schematic diagram of a modified fluid system for operating the centering compensator.

As shown in FIGS. 4 and 5, a cam follower 43' carried within a housing 13' includes a cam roller 44C' and a drive link 44B' mounted on the same end of an intermediate lever 44A'. Preferably, cam roller 44C' and drive link 44B' are each mounted on a common pivot member 47' rotatably supported by link 44A'. As a result, cam roller 44C' is capable of rotating about the longitudinal axis of pivot member 47', while drive link 44B' pivots about the same longitudinal axis of pivot member 47'. Lever 44A' includes an opposite end having a journal opening of sufficient size to allow for insertion of a support shaft 45' and an attached eccentric bearing assembly 46' in the journal opening. During operation of the embodiment of FIGS. 4 and 5, centering piston 42' presses drive link 44B' toward cam actuator 32' as hydraulic fluid is introduced into cylinder 40'. Such movement of drive link 44B' toward cam actuator 32' serves to press cam roller 44C' into contact with a depression 34' formed in the surface of cam actuator 32'. The contact pressure achieved between cam roller 44C' and depression 34' provides a force which resists rotation of cam actuator 32' in either direction about a longitudinal axis of a cam shaft 36' extending through cam actuator 32. Only when an intentional steering input force above a predetermined break away force level is applied to cam shaft 36' from an attached tie rod will cam actuator 32' rotate in a clockwise or counter-clockwise direction relative to the longitudinal axis of cam shaft 36'. The force necessary to rotate cam actuator 32' must be greater than the hydraulic fluid resistance generated by pressure control device 162 through cam follower 43' against cam actuator 32'. When a sufficiently strong steering force acts on cam actuator 32', cam roller 44C' rides up centering depression 34' and drives link 44B' and piston 42' through cylinder 40', expelling hydraulic fluid from cylinder 40'. The expelled fluid flows from cylinder 40' through conduit 160 and re-enters pressure control device 162. Once the intentional steering input force acting on cam actuator 32' ceases, the positive caster of wheels 26 functions to return wheels 26 toward their center tracking position as discussed hereabove. This return movement of wheels 26 causes cam actuator 32' to rotate such that depression 34' again aligns with roller 44C'. At this point, the continuing pressure generated by pressure control device 162 functions to displace hydraulic fluid from control device 162 into cylinder 40', pressing cylinder 42', drive link 44B' and cam roller 44C' toward cam actuator 32' until cam roller 44C' re-enters centering depression 34'. As a result, roller 44C' rides down an inclined side wall of depression 34' and eventually comes to rest in a position wherein roller 44C' simultaneously contacts the opposite side walls of centering depression 34'.

The various forces acting between the cam follower and cam actuator of the present invention are shown in curves appearing in the graph of FIG. 6. The graph compares the turn angle of wheels 26 (0° corresponding to straight ahead tracking of the wheels) with the resistance force seeking to prevent further turning of wheels 26 away from their straight ahead positions. Curve A illustrates the resistance force caused by only the interaction between a cam roller and the centering depression. When wheels 26 are in their straight ahead positions, the resistance force has a maximum value of substantially 75 pounds. The value of the resistance force at 0° angle of turn is preferably sufficient to overcome spurious steering inputs generated either by the driver, the roadway or the steering system. As wheels 26 are turned from their straight ahead positions, the resistance force generated by the cam actuator tapers to zero at an angle of substantially 15° turn. The reason for this choice of cam surface will become clear from the following discussion.

Curve B illustrates the resistance force generated by typical positive wheel caster. It is quickly apparent that the resistance force generated by positive wheel caster rises from a minimum value at 0° turn to maximum values which may exceed 500 pounds as the wheel turn angle approaches 45°. For small degress of turn of substantially 0°–5°, the resistance force generated by positive caster is exceedingly small, often no more than 5–15 pounds. As a result, spurious steering forces can easily deflect wheels 26 from their straight ahead positions over small angles. At highway speeds, even small angles of deflection can easily lead to a vehicle leaving the road. Therefore, where only positive caster is present, the vehicle driver must frequently provide compensating steering forces for overcoming these spurious forces in order to maintain the vehicle proceeding along a straight ahead path.

Referring again to FIG. 6, curve C illustrates the composite resistance force resulting from addition of the cam resistance force of curve A to the positive caster resistance force of curve B. By carefully contouring the cam actuator, it becomes possible to provide an increased resistance force over relatively small angles as compared to the positive caster resistance force. This means that initial turning resistance is increased from a 5 pound level (typical of conventional positively castered wheels) to a resultant force level of 80 pounds achieved by combining the 5 pound positive caster force with a 75 pound resistance force generated at 0° turn for the cam actuator as shown by the value of curve A at 0°. The compensator generated resistance force supplements the positive caster force to provide an increased resistance force for angles of turn of substantially 15° in either direction from the straight ahead position of the wheels. After the wheels are turned through angles greater than substantially 15° in either direction, the only force resisting further turning movements is the positive caster of the wheels themselves.

While the effect of the cam actuator preferably operates over a turning range of substantially 15° to either side of a straight ahead position, it is considered within the scope of the present invention to shape the cam surface to provide a supplemental resistance force over any turning range encountered by the vehicle. For example, the cam surface could be cut to provide a resistance force for any turning angle between 45° to either side of center. Likewise, the supplemental resistance force provided by the present invention can be increased or decreased at any given angle by merely increasing or decreasing the contact pressure between the cam follower and cam actuator. For example, a booster vacuum over hydraulic pressure control device could be selectively actuated to provide increased vacuum pressure capable of exerting additional force on the hydraulic fluid acting against the centering piston, thereby increasing the pressure of the centering piston against the cam follower.

While the vacuum over fluid pressure control device 162 can be employed with either of the embodiments shown in FIGS. 1 and 4, it is also considered within the scope of the present invention to drive the cam follower in the various embodiments with any type of fluid pressure control device.

For example, it is noted in FIG. 5, that port 51' may be connected via lines 58 and 60 to an accumulator 62 which provides hydraulic fluid under pressure to cylinder 40'. The accumulator has a pressure chamber 64, an air chamber 66 separated from the pressure chamber by a movable accumulator piston 68, and a reservoir chamber 70 separated from the air chamber by a wall 72. Air chamber 66 is connected through a check valve 73 and a line 74 to a compressed air source 76. Valve 73 may be a Schraeder valve of the type used in the valve stems of pneumatic tires and line 74 may represent an air hose that can be disconnected after chamber 66 has been pressurized. Although valve 73 is optional and may be a pressure regulator valve or a stop valve instead of a check valve, some type of cut-off valve near port 77 is preferred to limit the volume of air compressible by piston 68. This allows hydraulic pressure in cylinder 40' to be controllably varied over a relatively wide range because the air trapped in chamber 66 provides a spring-like return force which increases with compressive movement. The stroke of piston 68 within the accumulator should be long enough for pressure chamber 64 to receive the entire volume of fluid from cylinder 40' without the piston bottoming out against wall 72.

Reservoir 70 is vented either to atmosphere or to engine vacuum through a line 78 containing an air filter 80. Air pressure in chamber 66 acts through piston 68 to store fluid energy received from the hydraulic side of the system which is pressurized and kept full of hydraulic fluid by a pump 82. Pump 82 pumps fluid from reservoir 70 to line 60 through a check valve 84. Pump 82 is preferably electric and has a control mechanism 85 operable from the driver's station of the vehicle to vary the hydraulic system pressure. The pump control may be comprised of a manual switch in combination with a pressure gauge to indicated accumulator pressure. Alternatively, the pump may be actuated automatically by a pressure regulator for maintaining a preselected system pressure. A selector switch is then provided to vary the pressure settings of the regulator. By varying the pressure, the break away resistance and return force produced by the accumulator can be increased as vehicle speed increases. The range of pressures available should be selected so that break away resistance can be varied from relatively soft at low speeds to relatively hard at high speeds. As another alternative, break away resistance can be varied directly in response to vehicle speed by using a variable speed pump and tying it to vehicle speed. Two such pumps are already available on motor vehicles, one in the automatic transmission and the other in the power steering system, and either of these could be used to power the steering compensator. A separate hydraulic pump driven by the power steering belt would serve the same function and have the advantage of automatically cutting off with the power steering system.

A bleed line 86 containing a normally closed cock 88 allows chamber 64 to be completely filled with hydraulic fluid. In this connection, lines 86 may bleed back to reservoir 70. As an alternative, the line may be eliminated by arranging line 60 and the accumulator components so as to form an air trap venting back to the reservoir through pump 82.

The vehicle steering system is properly centered when cam roller 44C' rests against the bottom of depression 34'. In order to move or break away from depression 34', cam actuator 32' must overcome the resistance provided by accumulator pressure acting through a return line 90 containing a check valve 92. An additional level of resistance to be overcome for turning movement may be provided by a pressure differential valve 96 in a discharge line 98 containing an orifice 100. Until pressure in cylinder 40' exceeds the setting of valve 96, movement of centering piston 42' is prevented by liquid trapped in cylinder 40' by this valve in line 98 and return check valve 92 in parallel line 90. When the pressure setting of the differential pressure valve is reached, fluid then flows through line 98 into accumulator chamber 64. Orifice 100 controls the rate of fluid flow out of the cylinder 40' when valve 96 is open. The orifice may be fixed or variable in size and in either case provides a flow resistance that varies in response to the rate of piston movement. A variable size orifice having a remotely controlled solenoid 101 may be provided to make the flow restriction also controllably variable in response to vehicle speed or a manual selector and may comprise a solenoid operated throttle valve or multiported valve with different size outlet orifices.

Valve 96 is preferably of the spring biased type and dotted line 102 represents a pilot line through which cylinder pressure is applied until it overcomes the force of diaphragm spring 104 and opens the valve. The pressure setting of this valve can be varied by adjusting the spring tension, and the valve may include a remotely controlled solenoid 105 so that the pressure differential can be manually or automatically varied in accordance with vehicle speed.

The pressurized hydraulic fluid available from the accumulator is transmitted to the cylinder 40' through the return line 90. This accumulator energy provides the return force for reseating cam follower 44C' in its centered position upon removal of intentional steering inputs.

Although accumulator pressure alone will resist off-center movement of the piston in the absence of a pressure differential valve, it is preferable to use this valve so that the steering force required to make a turning movement away from center is substantially higher than the return force returning the system to center upon removal of the steering force. The preferred pressure parameters for using the compensator with a power steering system are a range from 50-150 psi in the accumulator and a differential pressure in the range of 200-300 psi for opening valve 96. The size of orifice 100 is preferably within the range of 0.03 to 0.06 inches.

Although pressure differential valve 96 is optional, the use of this valve is an important feature of the invention because it provides improved centering stability and steering control. The steering force may vary within the range of resistance represented by valve 96 without generating any steering movement. This valve opens at its set point and remains open as long as a pressure differential above the set point exists between line 58 and line 60. It will therefore remain open while cam roller 44C' is moving away from its rest position in depression 34' and will close when such movement stops, flow through orifice 100 lowering the pressure differential below the set point. Thereafter, when the steering force drops below the opposing return force generated by accumulator pressure and any positive wheel caster, piston 42' returns to its extended position as fluid flows from the accumulator through check valve 92. Pressure valve 96 in combination with accumulator 62 therefore provides a static resistance force greater than the static force provided by the accumulator alone. The term "static" is used in this specification to distinguish the variable resistance provided by orifice 100 in response to the rate of fluid flow produced by movement of a centering piston. By comparison, both means of static resistance may be present without fluid flow.

A bypass line 120 is provided for depressurizing the hydraulic side of the system by dumping accumulator chamber 64 and cylinder 40' to reservoir 70 which is vented through line 78. Bypass line 120 contains a pressure relief valve 122 to protect the system from over-pressurization and a power steering safety valve 124 where the system is employed on a vehicle with a power steering unit. The relief valve is preferably set at 50-150 psi greater than the maximum system pressure required to open differential pressure valve 96, that pressure being the sum of accumulator pressure and the differential pressure setting. For an accumulator pressure of 150 psi and a differential pressure setting of 300 psi, the relief valve would be set in the range of 500-600 psi. The power steering safety valve is preferably a solenoid operated valve actuated by a switch for detecting flow or pressure in the recirculation line found on conventional power steering pumps. The valve is open when deactivated and is actuated to its closed position in response to fluid flow generated by pump operation. Thus, when the pump is not operating, whether due to engine shut-off, breakage of the drive belt or other power steering failure, the power steering safety valve remains open to dump centering cylinder pressure to the reservoir.

A manual on-off valve 126 and a speed sensitive valve 128 may also be optionally provided. The manual on-off valve is preferably a solenoid valve actuated by an on-off switch located at the driver station of the vehicle so that the driver can selectively activate the compensator. The speed sensitive valve is also preferably a solenoid valve and is actuated to its closed position by a switch operated in response to a vehicle speed detecting mechanism, such as conventional speed switches associated with the speedometer or transmission train of a motor vehicle. The speed sensitive valve may remain open at low speeds so that small radius turning maneuvers can be executed without centering resistance, and closed at speeds above about 25 to 30 miles per hour to provide centering compensation at highway speeds which involve only large radius turning maneuvers.

The particularly important "trim" feature of the invention need not be achieved only through means of reversible electric motor 20. Rather, various types of trim mechanisms can be employed. Trimming is accomplished in the embodiment of FIG. 5 by controllably varying the pivotal position of trim lever 16' relative to the frame of the vehicle. A coupling of remotely variable length is used for this purpose and preferably comprises a trimming piston 130 carried on one end of trimming rod 19', the other end of rod 19' being connected to trimming lever 16' as described above. Piston 130 reciprocates in a chamber 131 attached to the frame 9 by a pivotal connection 133. The trimming chamber 131 has a retraction portion 132 and an extension portion 134. Pressure from the accumulator is supplied to the retraction portion through a check valve 136 and an inlet orifice 138 and to the extension portion through a check valve 140 and an inlet orifice 142. Pressure is released or dumped from the trimming chamber to the reservoir chamber 70 through a line 144, the flow path from extension portion 134 including line 146 containing a normally closed solenoid valve 148 and an outlet orifice 150 and the flow path from retraction portion 132 including line 152 containing a normally closed solenoid valve 154 and an outlet orifice 156. Inlet orifices 138 and 142 are of a small cross-section, preferably 0.006 to 0.01 inches in diameter, while outlet orifices 150 and 156 are of much larger diameter, preferably 0.015 to 0.03 inches in diameter. Accordingly, the opening of one or the other of stop valves 148 and 154 produces a pressure differential approximately equal to accumulator pressure across the piston 130 causing it to extend or retract depending on which stop valve is opened. Outlet orifices 150 and 156 are preferably used to provide more positive control of the rate of movement of piston 130. Both inlet and outlet orifices are optional since the corresponding lines may be sized to provide appropriate flow resistance both upstream and downstream of the trimming chamber to adequately control movement of the trimming piston.

During operation of the remotely controlled trim compensator employed in the embodiment of FIG. 5, the wheels 26-26 are trimmed toward the right side of the vehicle by opening valve 148 to retract rod 19' in a direction causing clockwise rotation of attached lever 16'. A trim to the left is produced by opening valve 154 to extend rod 19' in a direction causing counter-clockwise rotation of lever 16'. When the desired course correction is achieved, the opened valve is closed. Valve closure traps fluid on either side of piston 130 and thereby locks lever 16', shaft 45' and cam follower 43' into position relative to cam actuator 32'. Because of the flow restriction imposed by the smaller trimming orifices 138 and 142, the flow of fluid allowing movement of piston 130 is relatively small and trimming correction takes place at a sufficient slow rate to be accurately controlled by the driver. It is preferable to have a trim control that also provides for opening solenoid valves simultaneously to permit trimming with the steering system of the vehicle and distinguished from trimming with pressure generated by the fluid pressure control device. In this trimming mode, the steering member is held in position giving straight ahead travel while pressure is equalized across the trimming piston by opening both valves. The valves are then closed simultaneously to lock the trimming piston within its cylinder.

It is to be understood that the invention can be used both with other tie rod arrangements and with steering systems that do not require tie rod arrangements, such as those with only one steerable member. Without the compensator of the present invention, spurious steering forces of relatively small magnitude can cause the vehicle steering system to move to one side or the other of center or to oscillate back and forth, thereby producing corresponding movements of the vehicle away from the desired direction of vehicular travel. Such spurious inputs may be caused by road forces acting on the vehicle wheels, environmental forces acting on the vehicle body, driver forces acting on the steering wheel, inherent off-center bias in the steering system itself, or any combination of these forces.

As previously described, the compensator in the embodiment of FIG. 5 is completely deactivated by manual opening of valve 126 or automatic opening of speed sensitive valve 128, pressure relief valve 122, or power steering safety valve 124. When any of these valves are open, pressure in the accumulator and in other parts of the fluid system is dumped to the vented reservoir. Without pressure in the fluid system, movement of the centering rod in response to vehicle steering will move centering piston 42 toward fluid port 51, with piston 42 remaining at its point of furtherest movement until the fluid system is repressurized. When all of the dump valves are closed, the fluid system in FIG. 5 is again pressurized by actuation of pump 82. Pump actuation may be manual or automatic as previously described. If automatic, an interlock is preferably used to deactivate the pump when any of the dump valves are open. This ensures that the pump will not produce any pressure in cylinder 40 while the system is deactivated. As an alternative to pressure actuation, the pump may be actuated automatically by the position of piston 68 in the accumulator. As a further alternative, a constant head pump can be utilized for pressurizing the hydraulic system and the accumulator may be omitted. However, the accumulator arrangement is preferred for its response to pressure-transients within the system.

It is important to understand that the centering compensation shown in FIGS. 1 and 4 each engages a vehicle steering system at a location between the steerable wheels and the steering gear assembly. As a result, spurious inputs from the steering colum and/or from a power steering unit are absorbed by the compensator before reaching the wheels. Likewise, spurious forces transmitted from the roadway are immediately absorbed in the compensator, rather than being transmitted through substantially the entire steering assembly before encountering any stabilizing resistance from the steering wheel. As a result, the compensator protects the interior components of the steering assembly from repeatedly oscillating between states of tension and compression.

INDUSTRIAL APPLICABILITY

As illustrated in the foregoing description, the invention is especially applicable to motor vehicles having power steering systems. The invention also has a wide range of other industrial applications and can be utilized to automatically center any device having a steered member interconnected by suitable linkages to a steerable member. For example, the invention is capable of providing centering compensation for the steering systems of a wide variety of vehicles, including automobiles, trucks, motorcycles and other on the highway and off the highway motor vehicles, small boats and large ships, and aircraft.

The centering components can be used alone as a centering mechanism without a remote trimming feature. Fixed trimming adjustments (non-remote) could be accomplished by installing a threaded coupling of adjustable length between the connecting rod and the centering lever or the tie rod. Furthermore, the liquid flow resistance features of the invention, such as those provided by valve 96 and orifice 100, can be used in combination with prior art return systems of the spring-loaded or pneumatically biased type.

The remote trimming features of the invention are usable not only with the compensator disclosed here, but also in combination with centering mechanisms of the prior art, such as those disclosed in U.S. Pat. Nos. 3,056,461 and 3,583,515, the contents of which are expressly incorporated herein by reference. Thus, the remotely operable trimming components can be combined with spring-loaded centering devices or pneumatic centering devices of known types and provided with an independent fluid system across the trimming piston. In addition, the trimming pressure differential may be provided pneumatically instead of hydraulically.

A number of modifications to the trimming components themselves are possible without departing from the scope of the invention. For example, the trimming cylinder could be replaced by the coil of a double-acting solenoid and the trimming piston replaced by the solenoid plunger. A fluid dampening component could be added to the plunger for controlling the rate of its movement within the coil. All of these alternatives would be remotely operable by electrical switches at the steering station of the vehicle.

What is claimed is:

1. A steering compensator apparatus for use on a vehicle having a steering system for moving at least one steerable member to either side of a preselected position in response to a steering force transmitted through a reduction gear, said apparatus comprising:

resistance means connected to said steering system at a location between said steerable member and said reduction gear for providing a resistance force preventing substantial movement of said at least one steerable member away from said preselected position until the steering force on the low ratio side of said reduction gear exceeds a predetermined value;

activating means operable for varying the amount of resistance force provided by said resistance means; and, control means for operating said activating means from a location remote to said resistance means such as a driver's station of said vehicle so as to selectively vary the amount of said resistance force while said vehicle is in operation.

2. The apparatus of claim 1, wherein said at least one steerable member comprises a steerable wheel in contact with a vehicle supporting surface and said contact generates a positive caster force upon movement of said steerable wheel over said supporting surface, said positive caster force supplementing said resistance force to resist turning movements of said steerable wheel to either side of said preselected position.

3. The apparatus of claim 1, wherein said resistance means includes fluid means for providing fluid resistance opposing movement of said at least one steerable member to either side of said preselected position.

4. The apparatus of claim 3, wherein said resistance means further includes control means for controllably varying the amount of fluid resistance opposing movement of said at least one steerable member to either side of said preselected position.

5. The apparatus of claim 3, wherein said fluid is a liquid.

6. The apparatus of claim 3, wherein said fluid means includes pressure control means and at least a portion of said fluid resistance is provided by static fluid pressure.

7. The apparatus of claim 6, wherein said fluid pressure control means comprises a fluid piston within a fluid cylinder and a vacuum is employed on one side of said piston to provide said static fluid pressure.

8. The apparatus of claim 7, wherein said cylinder comprises an elongated chamber having a dividing wall extending through an intermediate portion of said chamber and dividing said chamber into first and second cylinders, said piston being arranged in said first cylinder so as to prevent fluid flow across said piston.

9. The apparatus of claim 8, wherein said dividing wall includes an opening joining an interior portion of said first cylinder with an interior portion of said second cylinder, said opening having a cross-sectional configuration substantially similar to the cross-sectional configuration of a push rod connected to said piston and extending from said first cylinder through said opening and into said second cylinder such that movement of said piston through said first cylinder provides a corresponding movement of said push rod through said second cylinder.

10. The apparatus of claim 9, wherein said fluid pressure control means includes reservoir means in fluid communication with said second cylinder for supplying fluid thereto.

11. The apparatus of claim 9, wherein said second cylinder includes a fluid port for introducing fluid into and out of said second cylinder; and wherein said first cylinder includes a vacuum port in fluid communication with a vacuum source for withdrawing fluid from said first cylinder, one one side of said piston and an air vent located on the other side of said piston for allowing air to enter a portion of said first cylinder, said air cooperating with said vacuum source to create a pressure differential across said piston so as to move said piston within said first cylinder and simultaneously move said push rod within said second cylinder.

12. The apparatus of claim 1, wherein said resistance means comprises:

a cam actuator connected to said steerable member for joint movement therewith, said cam actuator including a cam surface formed on a portion thereof, said cam surface having a centering depression; and, a cam follower assembly including a cam follower for simultaneously contacting opposite sides of said centering depression and a drive means for pressing said cam follower into contact with opposite sides of said centering depression.

13. The apparatus of claim 12, wherein said drive means includes fluid means in fluid communication with a centering cylinder so that fluid pressure from said fluid means displaces and drives a centering piston in said centering cylinder, said centering piston being connected to linkage means for pressing said cam follower into abutment with said centering depression.

14. The apparatus of claim 13, wherein said cam actuator, said cam follower assembly and said centering piston are positioned within a chamber formed within a compensator housing.

15. The apparatus of claim 12 which further includes trimming means for adjusting the preselected position of said steerable member.

16. An apparatus for positioning at least one steerable member movable to either side of a preselected position, said apparatus comprising:

resistance means for providing a resistance force resisting steering forces tending to move said at least one steerable member to either side of said preselected position;

trim means operable for varying said preselected position of said steerable member; and, actuator means for operating said trim means so as to controllably vary said preselected position of said steerable member from a location remote from said trim means and said steerable member.

17. The apparatus of claim 16 in which said resistance means includes return means for providing a return force biasing said at least one steerable member toward said preselected position when said steerable member is moved a predetermined distance to either side of said preselected position.

18. The apparatus of claim 16, wherein said resistance means includes a cam actuator mounted for rotation on a cam shaft connected to said steerable member, said cam actuator including a cam surface having a centering depression in contact with a cam follower means when said steerable wheel is in said preselected position, said cam follower cooperating with said centering depression to resist rotation of said cam actuator and movement of said steerable member to either side of said preselected position.

19. The apparatus of claim 18, wherein said cam follower means includes a follower lever pivotally mounted on a support shaft having an eccentric bearing assembly extending through a journal opening in said follower means lever such that rotation of said support shaft and eccentric bearing assembly alters the position of said cam follower means relative to the rotational axis of said cam actuator.

20. The apparatus of claim 19, wherein said trim means includes a reversible electric motor having a trimming rod movable upon actuation of said motor, and actuator means comprising a switch electrically connected to said reversible electric motor so that actuation of said switch causes said reversible electric motor to move said trimming rod, said trimming rod cooperating with said follower lever support shaft so that movement of said trimming rod causes said support shaft and said eccentric bearing to rotate within said follower lever journal opening and thereby alter the position of said cam follower and said cam actuator in contact therewith.

21. The apparatus of claim 16 for positioning at least one steerable member supported for said movement on a frame means, and in which:

said resistance means includes a linkage of variable length extending between said steerable member and said frame means, the length of said linkage defining said preselected position;

said trim means includes a first member and a second member movable relative to each other to vary the length of said linkage; and, said actuator means includes drive means for moving said first and second members relative to each other so as to controllably vary said preselected position.

22. The apparatus of claim 21 in which one of said first and second members comprises a piston movable in a fluid pressure chamber to controllably vary said preselected position.

23. The apparatus of claim 22 in which said drive means includes fluid means for providing a fluid pressure differential across said piston to move said piston relative to said chamber.

24. The apparatus of claim 23 in which said fluid means includes control means for controlling the direction of said pressure differential across said piston.

25. The apparatus of claim 24 in which said control means includes means for controlling the rate of said piston movement relative to said chamber.

26. The apparatus of claim 21 in which said drive means comprises a reversible electric motor and one of said first and second members is movably connected to said electric motor.

27. A steering compensator apparatus for use on a vehicle having a steering system for moving at least one steerable member to either side of a preselected position in response to a steering force transmitted through a reduction gear, said apparatus comprising:

return means for providing a return force other than force transmitted through said steerable member, said return force continuously biasing said steerable member toward said preselected position when said steerable member is moved a predetermined distance to either side of said preselected position, and, resistance means for providing a resistance force comprised of said return force and a differential force in addition to said return force, said resistance means preventing substantial movement of said steerable member away from said preselected position until said steering force exceeds both said return force and said differential force, and said return means and said resistance means being connected to said steering system at a location between said steerable member and said reduction gear.

28. The apparatus of claim 27, wherein said resistance means includes means for varying said resistance force preventing substantial movement of said steerable member away from said preselected position.

29. The apparatus of claim 27, wherein said return means includes control means for controllably varying the amount of return force continuously biasing said at least one steerable member toward said preselected position.

30. An apparatus for use on a vehicle having a steering system with at least one steerable member mounted on a frame for movement to either side of a preselected position in response to a steering force, said apparatus comprising:

resistance means for providing a resistance force opposing movement of said steerable member away from said preselected position, said resistance means including a centering member movable with said steerable member and having a centered position relative to said vehicle frame corresponding to the preselected position of said steerable member; and, trim means for changing the centered position of said centering member relative to said vehicle frame so as to selectively vary the preselected position of said steerable member while said vehicle is in operation.

31. The apparatus of claim 30 in which said trim means includes drive means for causing trimming movement of said centering member in response to at least one remote input so as to change said centered position while said vehicle is in operation and control means for selectively providing said at least one remote input to said drive means from a location remote to said resistance means such as a driver's station of said vehicle.

32. The apparatus of claim 31 which further includes activating means for causing said resistance means to provide said resistance force at selected times during operation of said vehicle.

33. The apparatus of claim 32 in which said activating means includes means for varying the amount of resistance force provided by said resistance means, and in which said control means includes means for actuating said activating means so as to selectively vary the amount of resistance force provided by said resistance means while said vehicle is in operation.

34. The apparatus of claim 30 in which said resistance means includes means for preventing substantial movement of said steerable member away from said preselected position until said steering force exceeds by a preselected amount of differential force a return force biasing said steerable member toward said preselected position.

35. The apparatus of claim 34 in which said resistance means further includes means for selectively varying the amount of said differential force.

36. The apparatus of claim 34 which further includes means for controllably varying the amount of said return force.

37. An apparatus for positioning a steering system having at least one steerable member mounted on a frame for movement to either side of a preselected position, said apparatus comprising:

resistance means for providing a resistance force resisting steering forces tending to move said steerable member to either side of said preselected position, said resistance means including linkage means for connecting said resistance means to said frame at a first point of connection and for connecting said resistance means to said steering system at a second point of connection in spaced relation to said first point of connection, said spaced relation defining a centered distance when said steerable member is in said preselected position; and, trim means for varying the preselected position of said steerable member, said trim means including drive means for causing said linkage means to vary said centered distance and control means for selectively actuating said drive means so as to selectively vary said centered distance and the corresponding preselected position of said steerable member from a location remote from said drive means.

38. An apparatus for use on a vehicle having a steering system for moving at least one steerable member to either side of a preselected position in response to a steering force transmitted through a reduction gear, said apparatus comprising:

return means connected to said steering system at a location between said steerable member and said reduction gear for providing a return force other than force transmitted through said steerable member, said return force continuously biasing said steerable member toward said preselected position during movement of said steerable member through a predetermined distance to either side of said preselected position;

activating means operable for varying the amount of return force provided by said return means; and, control means for operating said activating means from a location remote to said return means such as a driver's station of said vehicle so as to selectively vary the amount of said return force while said vehicle is in operation.

39. The apparatus of claim 38 which further includes resistance means for preventing substantial movement of said steerable member away from said preselected position until said steering force exceeds said return force by a preselected amount of differential force.

40. The apparatus of claim 39, wherein said resistance means further includes control means for controllably varying the amount of said differential force.

41. A steering compensator apparatus for a vehicle having a steering system for moving at least one steerable member to either side of a preselected position in response to a steering force transmitted through a reduction gear, said apparatus comprising:

resistance means connected to said steering system at a location between said steerable member and said reduction gear for providing a resistance force preventing substantial movement of said at least one steerable member away from said preselected position until the steering force on the low ratio side of said reduction gear exceeds a predetermined value, said resistance means including fluid means for causing a fluid to flow in response to movement of said at least one steerable member away from said preselected position; and, valve means for controlling said fluid flow, said valve means having a first condition for controlling said fluid flow so as to prevent substantial movement of said at least one steerable member away from said preselected position and a second condition for controlling said fluid flow so as to allow said substantial movement, said valve means being operable from one of said conditions to the other of said conditions in response to a preselected amount of differential pressure across said valve means.

42. The apparatus of claim 41 which further includes:

activating means operable for varying said preselected amount of differential pressure; and, control means for operating said activating means from a location remote to said resistance means such as a driver's station of said vehicle so as to selectively vary said preselected amount of differential pressure while said vehicle is in operation.

* * * * *